March 5, 1946.  A. P. TERRY  2,396,030
FASTENER FOR PAPER FORMS AND THE LIKE
Filed Jan. 8, 1943
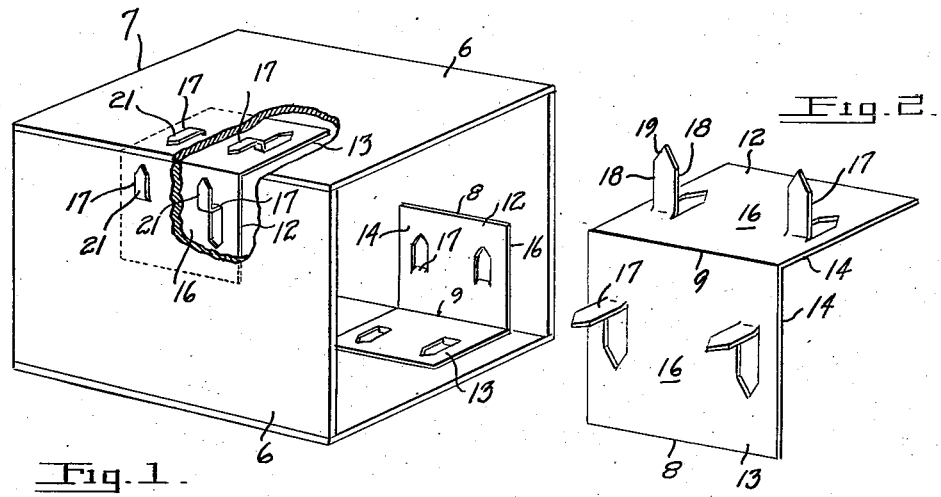
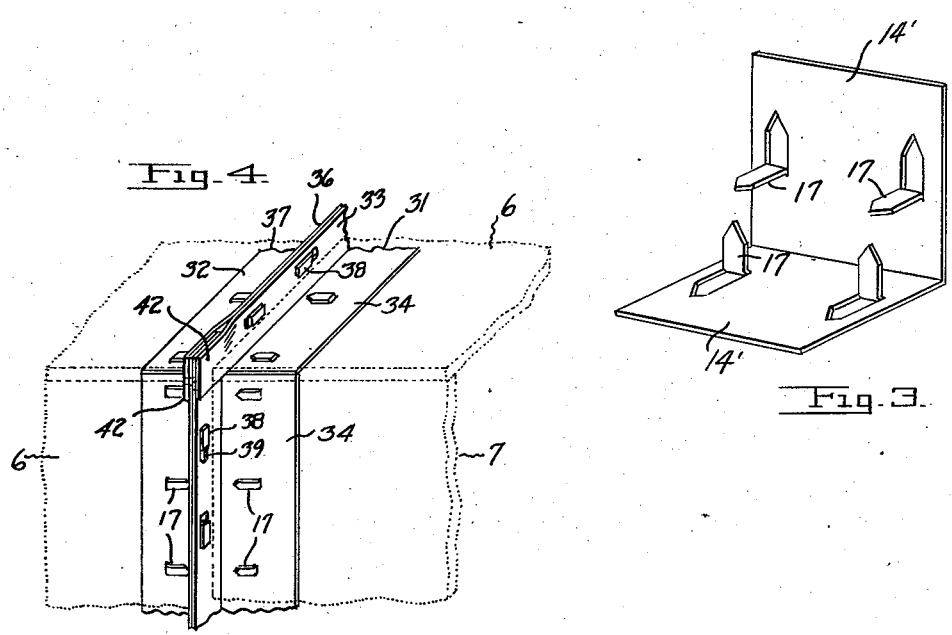
INVENTOR.
A. P. TERRY
BY Gardner & Warren
his attys.

Patented Mar. 5, 1946

2,396,030

UNITED STATES PATENT OFFICE 2,396,030

FASTENER FOR PAPER FORMS AND THE LIKE

Augustus P. Terry, Berkeley, Calif.

Application January 8, 1943, Serial No. 471,677

4 Claims. (Cl. 138—78)

The invention relates to fasteners such as for securing together the parts of paper forms, and more particularly for securing together and maintaining in proper relation the adjoining walls of a paper duct.

An object of the present invention is to provide a fastening means of the character described in which all of the parts of the fastener including the wall retaining and the wall attaching portions are provided as self contained and integral members of the fastener.

Another object of the invention is to provide a fastening means of the character described which will eliminate the need for using piercing tools, and avoid the necessity of aligning of fastener members and the handling of small loose parts.

A further object of the invention is to provide a fastening means of the character described which may be readily embodied in different forms adapted for use in holding and securing together the side walls of the same section of the duct, or for securing and holding together not only such walls but the walls of adjoining sections of the duct.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a portion of a duct showing the fastening means of my invention applied thereto, parts of the walls of the duct being broken away to show the hidden parts more clearly.

Figure 2 is a perspective view of the fastener above as shown in Figure 1.

Figure 3 is a perspective view of a fastener similar to that shown in Figure 2 but designed for application to the exterior of the duct.

Figure 4 is a fragmentary view similar to Figure 1 but showing a type of fastening means which may be in addition utilized for holding and securing together adjoining sections of the duct.

Figure 5 is a longitudinal sectional view through adjacent portions of adjoining duct sections, with the fastening means shown in Figure 4.

As illustrated in Figures 1 to 3, the fastening means of my invention is designed for use in retaining and securing in right-angular relation the adjacent side walls 6 of a duct 7 a section of which is illustrated in Figure 1. The walls 7 of the type of duct to which the present invention is particularly applicable, are constructed of paper, fibreboard, and the like, it being understood however that the fasteners may be used with plywood and other relatively soft materials or walls of a nature which can be readily pierced with an instrument with hand pressure. The type of duct referred to is usually formed with four side walls and is made square or of other rectangular form in cross-section.

As thus illustrated, the fastener comprises a plate 8 formed of a single piece of sheet material preferably metal, and bent or folded as at 9 to provide portions 12 and 13 arranged in angular relation corresponding to the relation between the walls of the duct to which the fastener is to be applied. The fastener as illustrated in Figures 1 and 2, is designed for application to the interior side of the walls of the duct, and is arranged for positioning at the juncture of the two sides to be retained and secured together thereby.

The sides 14 of the portions 12 and 13 arranged to be exposed on the interior of the duct are formed smooth and without protuberances, so as to avoid any interference with the flow of the sides 16 of the fastener arranged to lie against the walls 12 and 13, are a plurality of tongues 17 which are made so as to be capable of piercing the walls and being flexed intermediate the ends of the tongues in order that the walls may be firmly locked in place between the sides 16 of the plate portions and the bent ends of the tongues as will be hereinafter explained.

Each tongue, it will be clear, is formed as an integral part of the plates and is made by appropriately slitting the plate stock to form the sides 18 and free end 19 of the tongue and then bending the tongue at the base out of the plane of the associated plate portion so that the tongue will extend perpendicularly outward from the side 16. Since the tongues are required to pierce the walls, the ends 19 are beveled to a sharp point, and preferably the body of the tongues are made of relatively considerable width and with parallel side edges so that when the tongues are operatively engaged with the walls, there will be a firm engagement therebetween. In this connection it is important to note that the tongues are cut and bent at the base in such manner that the sides or faces of the tongues, rather the edges thereof, will be disposed parallel to the bend 9 of the plate. In view of this the broad surface of the tongues will be presented to resist separation of the adjacent walls at the joint.

In applying the fastener, it is merely inserted or positioned to lie at the juncture of the walls at what is to be the inside of the duct. The fastener is held with its sides 16 toward the walls, and then with a suitable backing preferably held against the sides 14 of the fastener, the walls are pressed against the prongs until the walls are pierced and engaged with the sides 16. The tongues, are made of considerably greater length than the thickness of the walls, and therefore when the walls are engaged with the side 16, an appreciable part 21 of the tongues will be projected from the outer side of the walls. As a final operation the parts 21 are clinched over and upon the walls so that the walls will be firmly secured and locked to the fastener and in position relative to each other.

Attention should also be directed to the fact that in forming the tongues in the plate portions, the portion of the tongue contiguous with the plate material is nearer the bend 9, and in this way when the tongue parts 21 are bent or clinched over the walls toward the joint therebetween, the portions of the walls clamped between the parts 21 and the body of the plate portions will be engaged by solid surfaces on both sides thereof. Furthermore the walls will be clamped nearer the joint and there will be less danger of the adjacent edges of the walls becoming separated along the joint.

If desired, the fasteners may be arranged for securing and holding the walls in position by application of the fastener to the exterior surfaces of the walls. A fastener adapted for this type of application is illustrated in Figure 3. In this embodiment the wall portions are bent as in the first described embodiment, but the tongues are struck out so as to extend from the sides 14' which are arranged to about the surfaces of the walls. In applying this form of fastener, it has been found preferable to completely pierce and lock one wall in position before effecting the piercing operation of the adjacent wall. In this way the protruding tongues of the one plate portion will not interfere with the ready positioning of the walls on the other plate portion during the applying operation.

In Figures 4 and 5, I have shown the fastener of a form designed not only to secure and lock the side walls of the duct together, but to secure and lock adjoining sections of the duct to one another at the ends. In this embodiment, the fasteners are provided in pairs, with one fastener 31 secured to the walls of one section, and the other fastener 32 secured to the walls of the other section, and both sections arranged to be secured together. As shown in the drawing, each of the fasteners 31 and 32, are formed of plates bent to respectively provide angular related portions 33 and 34, and 36 and 37. The portions 34 and 37 are formed with tongues 38 similar to the tongues 17, and arranged to pierce and lock over the walls of the adjoining sections. The fasteners 31 and 32 are arranged to be positioned with the portions 34 and 37 extending in reverse directions away from each other whereby the perpendicular portions 33 and 36 may be abutted one against the other. Attachment of the portions 33 and 36 together is preferably effected by means of tongues 38 provided on one of such portions here shown on the portion 36, and arranged to engage registering openings 39 on the other portion. After the tongues 38 are fully inserted through the openings, the former are arranged to be bent over and upon the portion 33 as clearly shown in Figure 4. Preferably, as a means of guiding the fasteners into proper positioning for attachment together, the fastener 32 is provided with a guide plate 41 which is secured to and extends from alongside the portion 37 and is arranged to slidably engage the corresponding side of portion 34 of fastener 31. The pairs of fasteners 31 and 32 are made long enough to extend completely across the walls, and in order to secure the adjacent walls of each section together, the portions 33 and 36 of each pair of fasteners are provided with end extensions 42 which are arranged to be spot welded or otherwise secured together so that all of the fasteners on each section will be rigidly held together in angular relation.

I claim:

1. A fastener for securing together walls of a paper duct or the like comprising a pair of plates of sheet material each bent to provide angularly related portions one of which is provided with upset pointed wall penetrating and clinching tongues, the other portions of the plates being formed with cooperating interlocking means for securing such portions together in side by side relation and with the contiguous portions aligned and reversely disposed.

2. A fastener for securing together walls of a paper duct or the like comprising a plate of sheet material bent to provide angularly related portions, one of said portions having pointed wall-penetrating and clinching tongues extending substantially parallel to and opposite said other portion, and a guide member extending from adjacent the bend in the plate reversely of said first mentioned portion and having a guide surface coplanar with one of the sides of the second mentioned portion.

3. A fastener for securing together walls of a paper duct or the like, comprising a pair of plates of sheet material each formed to provide angularly related portions one of which of each plate is provided with upset pointed wall penetrating and clinching tongues, the other portions of the plates being provided with cooperating interlocking means for securing such portions together in side by side relation and with the contiguous portions aligned and reversely disposed, and a guide member extending from one of the plates adjacent the bend and having a guide surface positioned to engage the first mentioned portion when the plates are operatively secured together.

4. A paper wall duct fastening means comprising a plate of sheet material bent to provide angularly related portions for engagement with the sides of adjoining wall of the duct, each of said portions having struck-up integral tongues with an inner part extending through the associated wall and an outer part clinched over and upon the wall, said tongues being bent at their base and intermediate their ends about axes parallel to the bend of the plate, and the pointed ends of the tongues extending toward the joint between the walls and away from the openings from which the tongues have been removed and bent to overlie the area of the portion without said openings.

AUGUSTUS P. TERRY.